US012039643B2

(12) United States Patent
Herath et al.

(10) Patent No.: US 12,039,643 B2
(45) Date of Patent: Jul. 16, 2024

(54) TILE-BASED SCHEDULING USING PER-TILE HASH VALUES

(71) Applicant: Imagination Technologies Limited, Kings Langley (GB)

(72) Inventors: Isuru Herath, Cambridge (GB); Richard Broadhurst, Chipperfield (GB)

(73) Assignee: Imagination Technologies Limited, Kings Langley (GB)

( * ) Notice: Subject to any disclaimer, the term of this patent is extended or adjusted under 35 U.S.C. 154(b) by 68 days.

(21) Appl. No.: 17/881,500

(22) Filed: Aug. 4, 2022

(65) Prior Publication Data

US 2022/0375145 A1    Nov. 24, 2022

Related U.S. Application Data

(63) Continuation of application No. 16/725,876, filed on Dec. 23, 2019, now Pat. No. 11,430,164.

(30) Foreign Application Priority Data

Dec. 21, 2018   (GB) ...................................... 1821183

(51) Int. Cl.
*G06T 1/20* (2006.01)
*G06T 1/60* (2006.01)
*G06T 11/40* (2006.01)

(52) U.S. Cl.
CPC ................ *G06T 11/40* (2013.01); *G06T 1/20* (2013.01); *G06T 1/60* (2013.01)

(58) Field of Classification Search
None
See application file for complete search history.

(56) References Cited

U.S. PATENT DOCUMENTS 6,259,460 B1 * 7/2001 Gossett .................... G06T 1/60
                                                      345/506
2007/0211070 A1    9/2007 Stenson
(Continued)

FOREIGN PATENT DOCUMENTS

CN    102142152 A    8/2011
CN    104103084 A    10/2014
(Continued)

OTHER PUBLICATIONS

Anglada et al; "Rendering Elimination: Early Discard of Redundant Tiles in the Graphics Pipeline"; arXiv:1807.09449v1 [cs.AR]; Jul. 25, 2018; pp. 1-12.
(Continued)

*Primary Examiner* — Steven Z Elbinger
(74) *Attorney, Agent, or Firm* — Potomac Law Group, PLLC; Vincent M DeLuca

(57) ABSTRACT

The graphics processing unit described herein is configured to process graphics data using a rendering space which is sub-divided into a plurality of tiles. The graphics processing unit comprises a tiling unit and rendering logic. The tiling unit is arranged to generate a tile control list for each tile, the tile control list identifying each graphics data item present in the tile. The rendering logic is arranged to render the tiles using the tile control lists generated by the tiling unit. The tiling unit comprises per-tile hash generation logic arranged to generate, for each tile, a per-tile hash value based on a set of textures that will be accessed when processing the tile in the rendering logic, and the tiling unit is further arranged to store the per-tile hash value for a tile within the tile control list for the tile.

20 Claims, 8 Drawing Sheets

(56) References Cited

U.S. PATENT DOCUMENTS

| | | |
|---|---|---|
| 2011/0074765 A1 | 3/2011 | Oterhals et al. |
| 2014/0292782 A1 | 10/2014 | Fishwick et al. |
| 2015/0097857 A1 | 4/2015 | Akenine-Moller et al. |
| 2015/0278981 A1 | 10/2015 | Akenine-Moller |
| 2016/0027144 A1* | 1/2016 | Fernandez .............. G06T 11/40 345/522 |
| 2017/0243323 A1 | 8/2017 | Croxford |
| 2017/0256079 A1 | 9/2017 | Akenine-Moller et al. |
| 2017/0316604 A1 | 11/2017 | Yang et al. |
| 2018/0365792 A1 | 12/2018 | Keramidas et al. |
| 2019/0129970 A1 | 5/2019 | Armangau et al. |
| 2020/0118239 A1 | 4/2020 | Wu et al. |
| 2020/0278977 A1* | 9/2020 | Halstead ............... G06F 16/285 |

FOREIGN PATENT DOCUMENTS

| | | |
|---|---|---|
| CN | 106233337 A | 12/2016 |
| WO | 2015/175231 A1 | 11/2015 |

OTHER PUBLICATIONS

Anonymous: "Bloom filter"; Retrieved from the Internet: URL:https://web.archive.org/web/20181210231311/https://en.wikipedia.org/wiki/Bloom_filter; Dec. 10, 2018; pp. 1-17.

* cited by examiner

TILE-BASED SCHEDULING USING PER-TILE HASH VALUES

CROSS-REFERENCE TO RELATED APPLICATIONS AND CLAIM OF PRIORITY

This application is a continuation under 35 U.S.C. 120 of copending application Ser. No. 16/725,876 filed Dec. 23, 2019, which claims foreign priority under 35 U.S.C. 119 from United Kingdom Application No. 1821183.9 filed Dec. 21, 2018.

BACKGROUND

Graphics processing systems are typically configured to receive graphics data, e.g. from an application running on a computer system, and to render the graphics data to provide a rendering output. For example, the graphics data provided to a graphics processing system may describe geometry within a three dimensional (3D) scene to be rendered, and the rendering output may be a rendered image of the scene. Some graphics processing systems (which may be referred to as "tile-based" graphics processing systems) use a rendering space which is subdivided into a plurality of tiles. The "tiles" are regions of the rendering space, and may have any suitable shape, but are typically rectangular (where the term "rectangular" includes square). To give some examples, a tile may cover a 16×16 block of pixels or a 32×32 block of pixels of an image to be rendered. As is known in the art, there are many benefits to subdividing the rendering space into tiles. For example, subdividing the rendering space into tiles allows an image to be rendered in a tile-by-tile manner, wherein graphics data for a tile can be temporarily stored "on-chip" during the rendering of the tile.

Tile-based graphics processing systems typically operate in two phases: a geometry processing phase and a rendering phase. In the geometry processing phase, the graphics data for a render is analysed to determine, for each of the tiles, which graphics data items are present within that tile. Then in the rendering phase, a tile can be rendered by processing those graphics data items which are determined to be present within that tile (without needing to process graphics data items which were determined in the geometry processing phase to not be present within the particular tile). The graphics data items may represent geometric shapes, which describe surfaces of structures in the scene, and which are referred to as "primitives". A common primitive shape is a triangle, but primitives may be other 2D shapes or may be lines or points also. Objects can be composed of one or more (e.g. hundreds, thousands or millions) of such primitives.

The embodiments described below are provided by way of example only and are not limiting of implementations which solve any or all of the disadvantages of known tile-based graphics processing systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The graphics processing unit described herein is configured to process graphics data using a rendering space which is sub-divided into a plurality of tiles. The graphics processing unit comprises a tiling unit and rendering logic. The tiling unit is arranged to generate a tile control list for each tile, the tile control list identifying each graphics data item present in the tile. The rendering logic is arranged to render the tiles using the tile control lists generated by the tiling unit. The tiling unit comprises per-tile hash generation logic arranged to generate, for each tile, a per-tile hash value based on a set of textures that will be accessed when processing the tile in the rendering logic, and the tiling unit is further arranged to store the per-tile hash value for a tile within the tile control list for the tile.

A first aspect provides a graphics processing unit configured to process graphics data using a rendering space which is sub-divided into a plurality of tiles, the graphics processing unit comprising: a tiling unit arranged to generate a tile control list for each tile, the tile control list for a tile identifying graphics data items that are present in the tile; a cache for storing texture data for use in rendering tiles; and rendering logic arranged to render the tiles using the tile control lists generated by the tiling unit and texture data stored in the cache; wherein the graphics processing unit comprises per-tile hash generation logic arranged to generate, for each tile, a per-tile hash value based on a set of textures that will be accessed when processing the tile in the rendering logic, and wherein the graphics processing unit is further arranged to store the per-tile hash value for a tile for use by the rendering logic.

A second aspect provides a method of processing graphics data using a rendering space which is sub-divided into a plurality of tiles, the method comprising: generating, in a graphics processing unit, a tile control list for each tile, the tile control list for a tile identifying graphics data items that are present in the tile; generating, for each tile, a per-tile hash value based on a set of textures that will be accessed when processing the tile in rendering logic in the graphics processing unit; storing the per-tile hash value for a tile for use by the rendering logic; and rendering the tiles, in the rendering logic, using the tile control lists and texture data stored in a cache.

The GPU may be embodied in hardware on an integrated circuit. There may be provided a method of manufacturing, at an integrated circuit manufacturing system, a GPU. There may be provided an integrated circuit definition dataset that, when processed in an integrated circuit manufacturing system, configures the system to manufacture a GPU. There may be provided a non-transitory computer readable storage medium having stored thereon a computer readable description of an integrated circuit that, when processed, causes a layout processing system to generate a circuit layout description used in an integrated circuit manufacturing system to manufacture a GPU.

There may be provided an integrated circuit manufacturing system comprising: a non-transitory computer readable storage medium having stored thereon a computer readable integrated circuit description that describes the GPU; a layout processing system configured to process the integrated circuit description so as to generate a circuit layout description of an integrated circuit embodying the GPU; and an integrated circuit generation system configured to manufacture the GPU according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
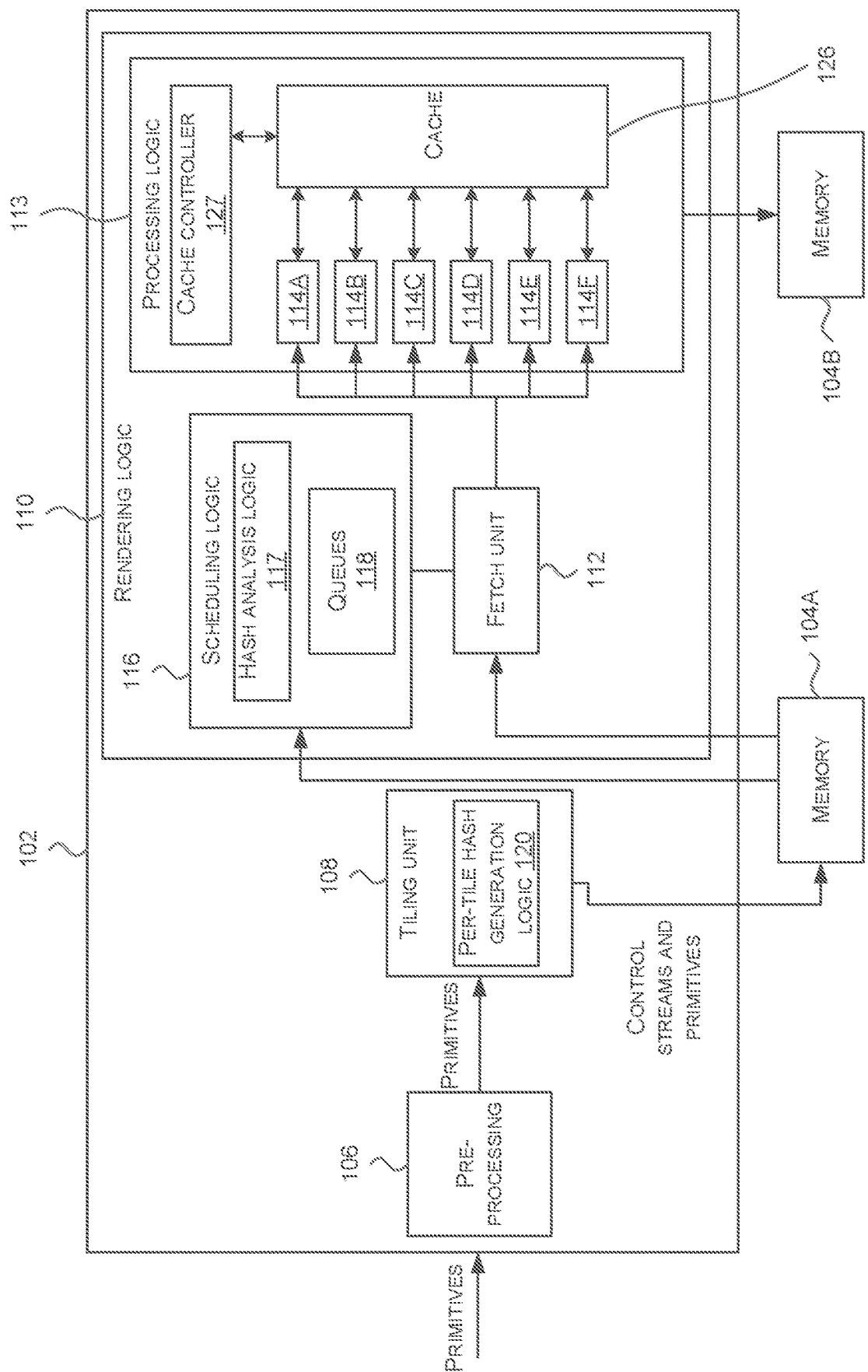
FIG. 1 is a schematic diagram of a graphics processing system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

As described above, tile-based graphics processing systems typically operate in two phases: a geometry processing phase and a rendering phase. In the geometry processing phase, the graphics data for a render is analysed to determine, for each of the tiles, which graphics data items are present within that tile and this information, e.g. in the form of a list of graphics data items (e.g. primitives) for the tile, is stored in a data structure which may be referred to as a tile control list (TCL). Then in the rendering phase, tiles are rendered by processing those graphics data items identified in the TCL for the particular tile. The order in which tiles are scheduled for processing may be fixed and based on a spatial-order scheduling scheme, such as Z-order or N-order.

Described herein are methods and apparatus for generating enhanced tile control lists that include additional information (e.g. within the header) about the textures that will be accessed when processing the tile and methods and apparatus for scheduling the processing of tiles based on this additional information. The additional information may, in addition or instead, be used for other decisions within a tile-based graphics processing system, for example as part of a cache eviction scheme. The additional information comprises a per-tile hash value that provides an indication of the work load in the tile. The indication may provide accurate information or may provide an approximation. In various examples the per-tile hash value may be implemented as a fixed size probabilistic data structure, such as a Bloom filter. This per-tile hash value may, for example, comprise a fixed number of bits, where this fixed number is in the range of 10-20 bits. Consequently, the inclusion of the per-tile hash in the TCL hence does not increase the size of the TCL significantly (i.e. the per-tile hash is very small in comparison to the amount of data required to store the list of primitives).

By including the per-tile hash value within the TCL, the scheduling of tiles and/or the eviction of data from the cache can take into consideration whether there is any overlap in texture accesses by different tiles and hence increase cache performance (i.e. increase the cache hit rate). The increased cache performance has the effect of reducing both execution time and bandwidth utilisation and ultimately results in a reduction in power consumption compared to systems that use a fixed spatial order for scheduling tiles. Where a Bloom filter is used as the per-tile hash, this provides a compact per-tile hash that can be easily compared for different tiles (i.e. the comparison requires little processing effort) and whilst there may be false positives (i.e. tiles which are identified to have more similar texture accesses than they actually have), there are no false negatives (i.e. the analysis will always identify those tiles with similar texture accesses). This in turn ensures that there is an improvement in cache performance (and hence execution time, bandwidth utilisation and power consumption) compared to known scheduling schemes (e.g. since a false positive is no worse than known systems which do not use per-tile hashes).

FIG. 1 shows some elements of a graphics processing system 100 which may be used to render an image of a 3D scene and which generates and uses enhanced TCLs. The graphics processing system 100 comprises a graphics processing unit (GPU) 102 and two portions of memory 104A, 104B. The two portions of memory 104A, 104B may, or may not, be parts of the same physical memory. The GPU 102 comprises a pre-processing module 106, a tiling unit 108 and rendering logic 110. The tiling unit 108 comprises logic 120 arranged to generate a per-tile hash. As described in detail below, the per-tile hash provides information about the textures in a compact form (e.g. in 10-20 bits) that will be accessed when processing the tile in the rendering logic 110. The rendering logic 110 comprises a fetch unit 112, processing logic 113 and scheduling logic 116. The processing logic 113 comprises one or more processing cores 114A-F, a cache 126 and a cache controller 127. The rendering logic 110 is configured to use the processing cores 114A-F of the processing logic 113 to implement hidden surface removal (HSR) and texturing and/or shading on graphics data (e.g. primitive fragments) for tiles of the rendering space. In this example, each processor core 114A-F can access the cache 126. That is, the cache 126 is shared amongst the processor cores 114A-F, although in other examples there may be multiple caches and each cache may be shared between a non-overlapping subset of the processor cores and/or there may be additional local caches that are not shared but instead are accessible by only a single processor core. The cache 126 may operate to store graphics data (e.g. primitive and/or texture data) that can be accessed by one or more of the processor cores 114A-F when those cores are rendering a respectively assigned tile. The graphics content of the cache 126 may be controlled by a cache controller 127. The cache controller 127 may, for example, be configured to write graphics data into the cache 126 from some other portion of memory. The cache controller 127 may also be configured to clear, evict, or flush graphics data being stored in the cache 126, e.g. to enable further data to be stored. The scheduling logic 116 (in the rendering logic 110) comprises hash analysis logic 117 and one or more rendering queues 118.

The graphics processing system 100 of FIG. 1 may comprise other elements not shown in FIG. 1, for example, a compiler configured to compile programs (e.g. shader programs) to be executed on the GPU 102. The compiler may write compiled shader programs to an intermediate memory (also not shown in FIG. 1), wherein at runtime the GPU 102 retrieves the compiled shader programs from the intermediate memory. Furthermore, the per-tile hash generation logic 120 and hash analysis logic 117 may be located in different places in the GPU 102 from those shown in FIG. 1.

In the example shown in FIG. 1 the rendering logic 110 comprises six processing cores 114A-F, but in other examples any suitable number of processing cores may be included in the rendering logic 110, e.g. in a range from 1 to 256, or even higher. The number of processing cores in the rendering logic 110 may be adapted to suit the intended use of the graphics processing system. For example, a graphics processing system to be used in a small mobile device which has tight constraints on processing resources and silicon size may include a small number of processing cores (e.g. 6 processing cores), whereas a graphics processing system to be used in a large device such as a PC or server which has less tight constraints on processing resources and silicon size may include a larger number of processing cores (e.g. 128 processing cores).

Figure 2A:
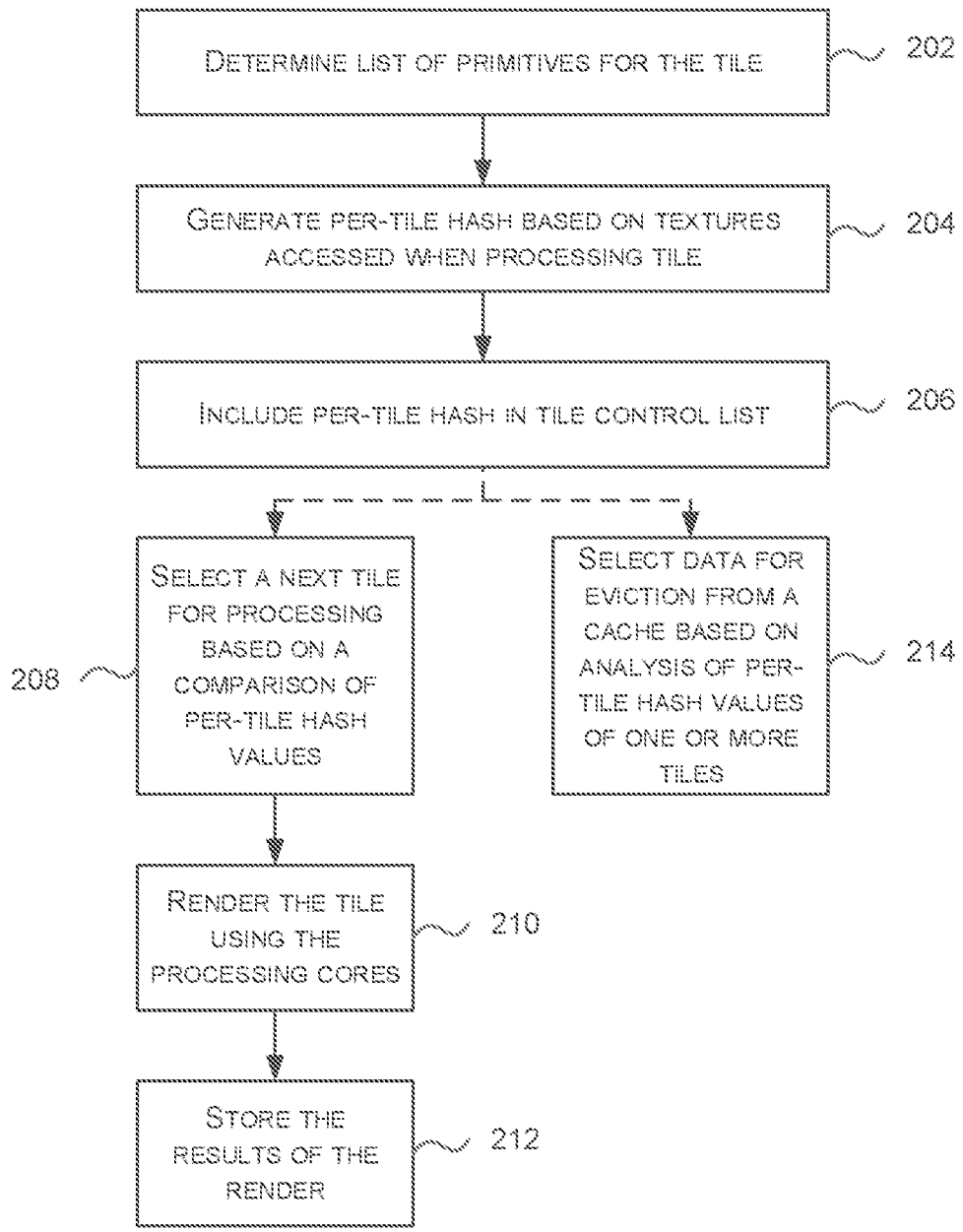
FIGS. 2A-2C are flow diagrams showing example methods of operation of the system of FIG. 1.

The operation of the graphics processing system 100 of FIG. 1 can be described with reference to the flow diagrams of FIGS. 2A-C. A sequence of primitives provided by an application (e.g. from a game application running on a CPU in the same computing system as the GPU 102) is received at the pre-processing module 106 within the GPU 102. In a geometry processing phase, the pre-processing module 106 performs functions such as geometry processing including clipping and culling to remove primitives which do not fall into a visible view. The pre-processing module 106 may also project the primitives into screen-space. The primitives which are output from the pre-processing module 106 are passed to the tiling unit 108 for tiling.

The tiling unit 108 determines which primitives are present within each of the tiles of the rendering space of the graphics processing system 100 (block 202). The tiling unit 108 assigns primitives to tiles of the rendering space by creating control streams for the tiles (in block 202), wherein the control stream for a tile includes indications of primitives which are present within the tile. In addition to generating the list of primitives for each tile, the per-tile hash generation logic 120 within the tiling unit 108 generates a hash value for each tile (block 204) and this hash value is included within the tile control list (block 206), e.g. within the header of the TCL. The enhanced TCL (including the per-tile hash value) and the primitives are output from the tiling unit 108 and stored in the memory 104A. The geometry processing phase (performed by the pre-processing module 106 and the tiling unit 108) takes account of primitives across the whole of an image, i.e. for all of the tiles in the image. It will be appreciated that whilst the per-tile hash generation logic 120 is shown as part of the tiling unit 108, in other examples it may be a separate unit and this may, for example, be positioned after the tiling unit 108 but before the control streams and primitives are output to memory 104A.

The hash value is generated (in block 204) using a hash function and based on the textures that will be accessed when the tile is processed by the rendering logic 110. For example, if when processing a first tile, textures A, B and C will be accessed, then the hash function is generated based on textures A, B and C, e.g. based on identifiers for textures A, B and C. A second tile may access textures B, C and D when processed and hence the per-tile hash for the second tile will be generated based on textures B, C and D (e.g. based on identifiers for textures B, C and D) and the resulting per-tile hash for the second tile is likely to be different from the per-tile hash value for the first tile. A comparison of the hash values for two tiles can be used to indicate a level of similarity in the textures used to render those tiles (i.e. to indicate approximately how many of the textures used to render one of the tiles is also used to render the other one of the tiles).

Any suitable hash function(s) may be used and by using more than one hash function and/or increasing the complexity of the hash function(s), the overall size of the per-tile hash value may be reduced (e.g. such that it comprises fewer bits than the total number of textures). In various examples, the per-tile hash value may initially comprise an array of zeros (e.g. n zeros, where in various examples, $10 \leq n \leq 20$). For each of the textures that will be accessed when processing the tile, one or more bits in the array are set (i.e. changed from 0 to 1). In various examples, the array may comprise the same number of bits as the number of available textures and the hash function may set a single bit in the per-tile hash value that corresponds to each of the textures that will be accessed when the tile is processed. In a variation of this, where there are fewer bits than the number of available textures, a bit may be set in the per-tile hash value based on one or more least significant bits in the texture identifier (e.g. where there are more than 10 textures, numbered 0-X, and only 10 bits in the per-tile hash, a bit indexed by the units, i.e. 0-9, may be set based on each texture identifier and the tens may be ignored). So if one tile uses textures 0, 1 and 2, its per-tile hash is 0000000111 and another tile uses textures 0, 11 and 13, its per-tile hash is 0000001011. In this way, textures 1, 11, 21, . . . will result in the same bit being set in the per-tile hash and hence some false positives but the use of a per-tile hash should still result in an overall improvement in cache performance and will certainly be no worse than known systems which do not use per-tile hashes.

Figure 3:
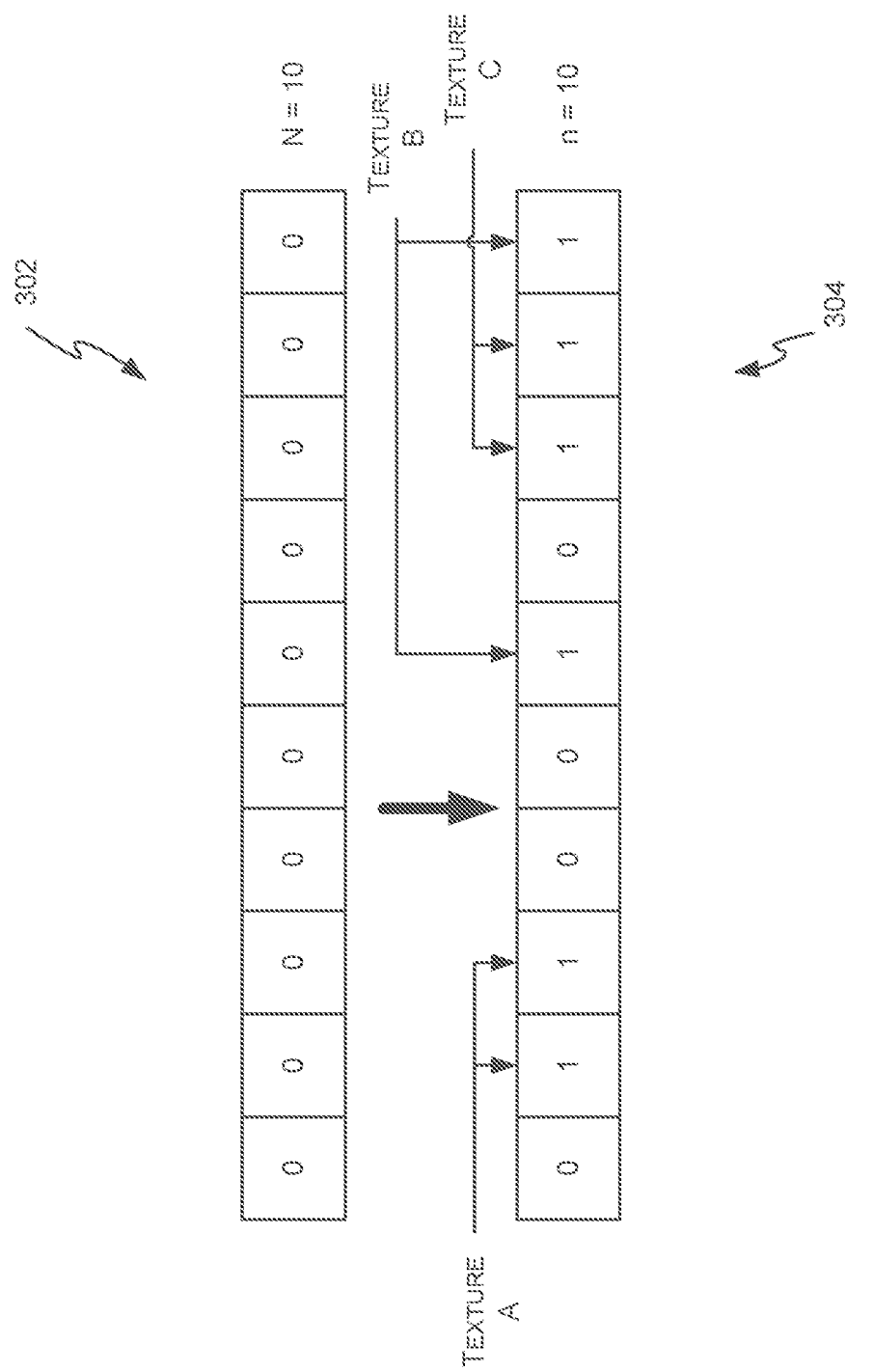
FIG. 3 shows a graphical representation of a method of generating a per-tile hash value.

In another example, more than one bit may be set for each of the textures that will be accessed when the tile is processed. In various examples, a Bloom filter or other probabilistic data structure may be used as the per-tile hash value and one or more hash functions may be used to generate the per-tile hash value, as shown graphically in FIG. 3. In the example shown in FIG. 3, the array 302 initially comprises only zeros and two hash functions are used, such that for each of the textures that will be accessed when processing the tile (e.g. for each of textures A, B and C), the identifier for the texture is fed into both of the hash functions and two bits are set within the array (i.e. each hash function identifies one bit position for the texture, and hence as there are two hash functions in this example, two bit positions are identified). Whilst in the example shown in FIG. 3, there is no overlap between the bits set for each of the textures A-C, depending upon the textures which are accessed, more than one texture may result in the setting of the same bit within the array, although each texture may result in the setting of a different pair of bits (or a different group of bits, where more than two hash functions are used).

The resulting populated array 304 is the per-tile hash value and is included within the TCL for the tile (in block 206).

Having generated the enhanced TCL (in block 206) and stored it in memory 104A, the per-tile hash value within the enhanced TCL may be used in one or more subsequent operations within the GPU 102, e.g. within the rendering logic 110. The rendering logic 110 renders tiles of the image using the processing cores 114A-F (block 210) and stores the outputs for rendered tiles in appropriate portions of a framebuffer (block 212), such that when all of the tiles of an image have been rendered, the framebuffer (e.g. in memory 104B) stores the rendered results for the whole image. In various examples, the enhanced TCL, and in particular the per-tile hash values within the enhanced TCLs, may be used to improve the efficiency of the rendering phase by improving the performance of the cache 126. Two different ways in which cache performance can be improved through the use of the per-tile hash values are shown in FIG. 2A and it will be appreciated that these may be used together or either may be used independently of the other. Additionally, the per-tile hash values may be used in other decision making processes within the rendering logic 110 to further improve the efficiency of the rendering phase.

The scheduling logic 116 within the rendering logic 110 determines the order in which tiles are processed by the processing cores 114A-F and which processing core processes a particular tile. In various examples, where the per-tile hash values within the enhanced TCLs are used in the scheduling of tiles, the hash analysis logic 117 within the scheduling logic 116 reads the per-tile hashes from the TCLs and performs a comparison between the per-tile hashes of one or more tiles that are currently in a queue 118 awaiting scheduling. Based on this comparison, a next tile to process is selected (block 208) and then rendered using the processing cores 114A-F (block 210) before the results of the render are stored (block 212), e.g. in memory 104B.

Figure 2B:
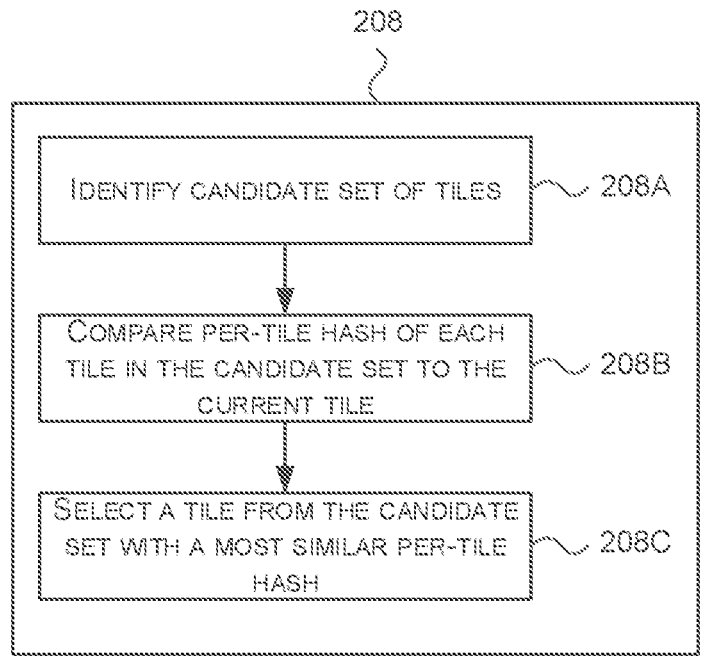
Figure 4:
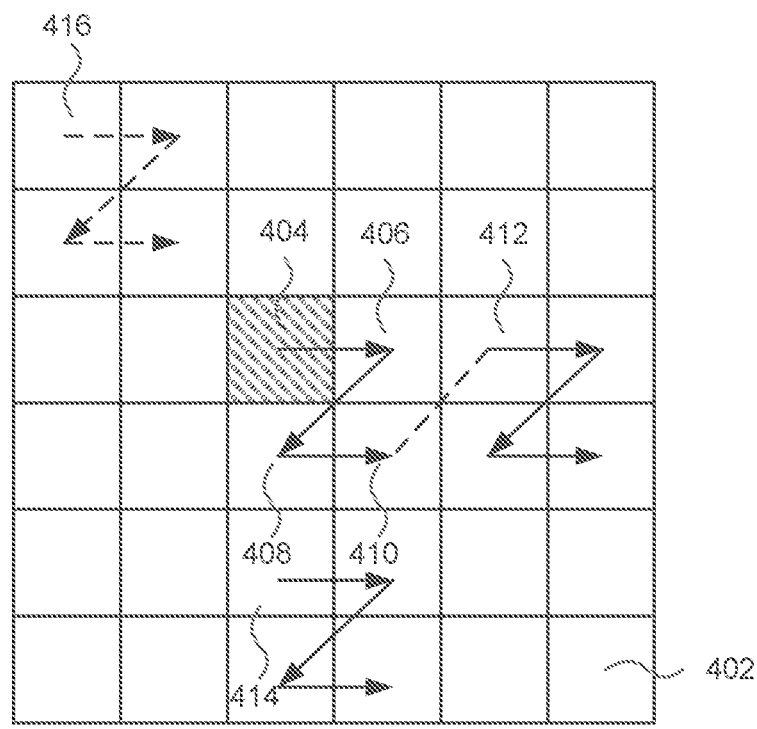
FIG. 4 is a schematic diagram showing a first example order of processing tiles.
Figure 5:
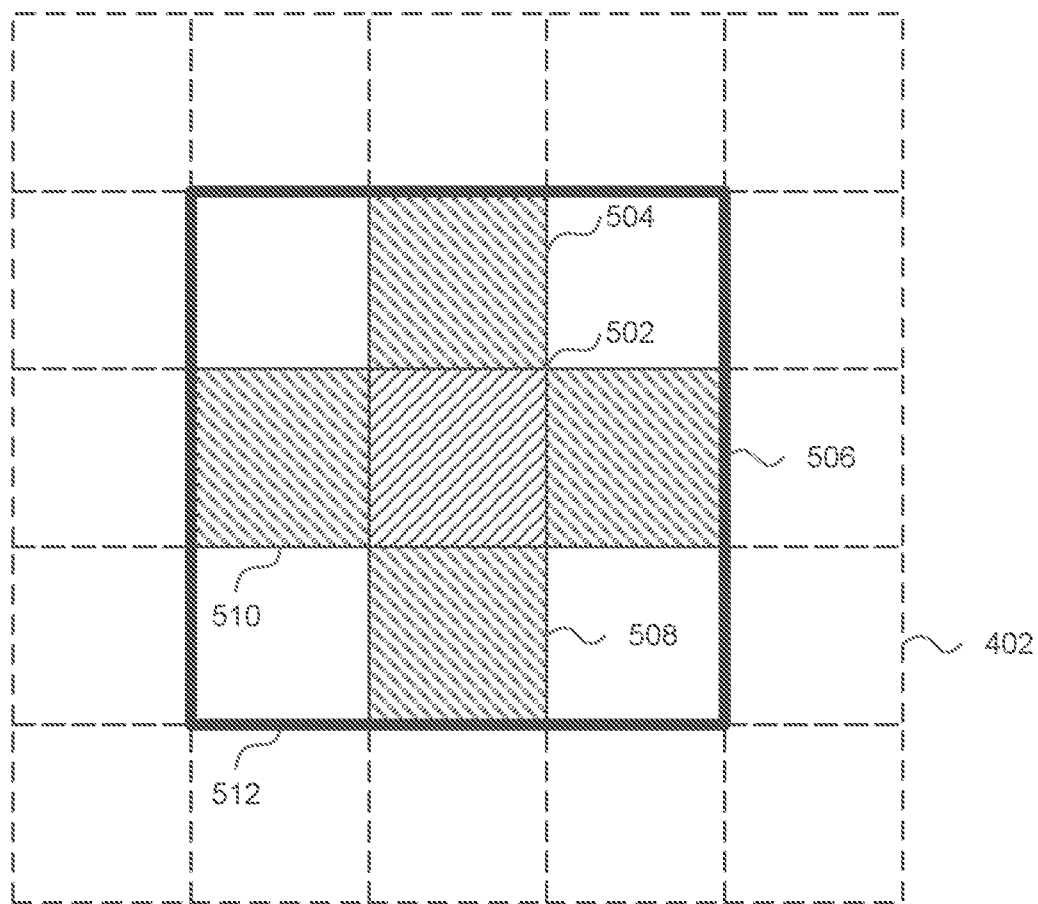
FIG. 5 is a schematic diagram showing a second example order of processing tiles.

In order to perform the selection (in block 208 as shown in FIG. 2B), the scheduling logic 116 (or the hash analysis logic 117) identifies a candidate set of tiles to be processed next (block 208A). This candidate set may comprise one or more tiles from the one or more queues 118 and may be selected from those one or more queues 118 based on one or more criteria. In various examples, the candidate set may be selected based on a spatial order scheme, such as N-order or Z-order, e.g. as shown graphically in FIG. 4, where each square 402 represents a tile, the shaded tile 404 is the current tile being processed and the arrows show the spatial order scheme. Where a spatial order scheme is used to determine the candidate set, the candidate set may comprise the next N tiles according to the spatial order scheme (e.g. in FIG. 4, if N=4, then the candidate set comprises the next four tiles 406-412 along the arrows). In various examples, N may be between 16 and 64 (e.g. where a render comprises approximately 2000 tiles). In other examples, the candidate set may comprise those tiles in the queue 118 that are neighbours of the current tile being processed, e.g. as shown graphically in FIG. 5, where each square 402 represents a tile, the centre tile 502 is the current tile being processed and the candidate set may comprise the four directly adjacent tiles 504-510 (shown shaded in FIG. 5) or the eight surrounding tiles (shown within the bounding box 512 in FIG. 5). In any of these examples, the candidate set will not include any tiles that meet the criteria but are not in the queue 118 (e.g. because they have already been processed). For example, if one of the four directly adjacent tiles 504-510 has already been processed, then that tile is not in the one or more queues 118 and hence is omitted from the candidate set.

Having identified a candidate set of tiles to be processed next (in block 208A), the hash analysis logic 117 accesses the per-tile hashes for each of the tiles in the candidate set from the enhanced TCL for each tile and compares the per-tile hash of each tile in the candidate set to the per-tile hash of the current tile being processed (block 208B). This comparison (in block 208B) may comprise a bitwise comparison to determine the number of bits in the per-tile hashes for each of the candidate set of tiles that are the same as the bits in the per-tile hash of the current tile being processed. The tile with the most similar per-tile hash (e.g. the most bits that match the per-tile hash of the current tile being processing) is then selected to be processed next (block 208C).

The description of FIG. 2B above refers to the 'current tile being processed' and this may be determined in any suitable manner. In various examples, where there are multiple tiles being processed at any one time (e.g. one tile by each of the processing cores 114A-F), then the current tile being processed may be considered to be the most recently scheduled tile. Alternatively, the comparison may be performed (in block 208) based on a comparison of the per-tile hashes of the tiles in the candidate set with the per-tile hashes of all of the tiles currently being processed (i.e. all of the tiles which have been scheduled for processing but which have not yet finished being processed). In the description herein references to the "current tile being processed" may refer more generally to a "currently scheduled tile", wherein a currently scheduled tile may, for example, be a current tile being processed or a most recently scheduled tile.

In various examples, the selection of a next tile to be processed based on a comparison of per-tile hash values (in block 208) may not be performed to determine each next tile to be processed but instead may be applied periodically, e.g. to select a next group of tiles to be processed, with the tiles within a selected group being processed in a fixed order. For example, where a spatial order scheme such as N-order or Z-order is used, each group of tiles may comprise those four tiles that form a local 'N' or 'Z', e.g. tiles 404-410 in the example shown in FIG. 4. Following the scheduling of the last tile in a group of tiles (e.g. tile 410 from the group of tiles 404-410), the method of FIG. 2B may be used to determine the next group of tiles to be processed, with the tiles being processed in spatial order within the group of tiles. For example, following the scheduling of the last tile in the group of tiles 404-410 (e.g. tile 410), a candidate set of tiles may be identified that comprises a first tile from each of a plurality of groups of tiles (e.g. tiles 412 and 414). Based on the comparison of per-tile hashes of those first tiles (in block 208B), one of the tiles is selected (in block 208C) and having selected a first tile of a group, the rest of the tiles in the group are processed in spatial order. This reduces the number of comparisons performed (as N comparisons are performed once per group, rather than once per tile); however, the resultant increase in cache performance may be less than where the comparison is performed in order to schedule each individual tile for processing.

In another variation of the selection operation (in block 208), having identified a candidate set (in block 208A), instead of comparing the per-tile hash of each tile in the candidate set to the per-tile hash of the current tile being processed, a first comparison compares the per-tile hash of a first tile in the candidate set to the per-tile hash of the current tile being processed and if the comparison (e.g. the number of matching bits) exceeds a threshold, that tile may be selected for processing without analysing the other tiles in the candidate set. If the threshold is not exceeded, the per-tile hash of a next tile in the candidate set may be compared to the per-tile hash of the current tile being processed, etc. The sequence in which tiles are compared in this example, may be based on a spatial order scheme (e.g. such that in the example of FIG. 4, if tile 404 is the current tile being processed, the first tile is tile 406, the next tile is tile 408, etc.) or based on any other criteria or the tiles may be selected from the candidate set at random. This variation also reduces the number of comparisons performed (as the number of comparisons that are performed in order to select each tile may be less than N); however, the resultant increase in cache performance may be less than where the comparison is performed in order to schedule each individual tile for processing. This variation may also be combined with the previous variation such that the number of comparisons that are performed in order to select each group of tiles may be less than N and the comparisons are only performed once per group of tiles.

It will be appreciated that where the candidate set of tiles is identified (in block 208A) based on a spatial order scheme, the resulting tile selection (in block 208C) is likely to disrupt the spatial order and result in tiles in the spatial order (e.g. individual tiles or whole groups of tiles) being skipped. For example, referring back to the example shown in FIG. 4, if the current tile is the shaded tile 404 and the candidate set comprises the next four tiles in the Z-order, tiles 406-412, then the next tile to be processed may result in no tiles being skipped (if tile 406 is determined to be the most similar and hence is selected in block 208C) or between one and three tiles being skipped (if one of tiles 408-412 is determined to be the most similar and hence is selected in block 208C). Where tiles are skipped, once the spatial order (e.g. Z-order) has traversed the entirety of the render space, it may start again at the beginning (e.g. with the top left tile 416 and following the dotted arrows) so that any tiles skipped in a previous scan of the render space may be scheduled. This may be repeated until all the tiles in the render space have been scheduled.

The use of the per-tile hash values in scheduling tiles is described herein in the context of a spatial order scheme. The selection mechanism described herein (and shown in FIG. 2B) may alternatively be used in combination with other selection criteria, such as cost estimates and/or other similarity indicators (e.g. as described in co-pending applications GB1700562.0 and GB1810776.3). For example, the cost estimates as described in co-pending application GB1700562.0 may be used in the selection of the candidate set (in block 208A).

As described above, by generating a per-tile hash value and using this to schedule tiles, more similar tiles (i.e. tiles with more textures in common) are scheduled close in time to each other and hence there is a higher probability that the data required to process the tiles will already be stored in the cache 126. This increases the number of cache hits and decreases the amount of data that has to be read from memory. That in turn reduces execution time and bandwidth utilisation and in turn reduces the power consumption of the GPU.

In addition to, or instead of, using the per-tile hash value to schedule more similar tiles close together in time, the per-tile hash value may be used to identify tiles that access (or otherwise use) resources that are slow to execute (e.g. a video decoder) and then avoid scheduling multiple tiles that access (or otherwise use) that particular resource at the same time. In addition, the per-tile hash may be used to schedule the particular resource evenly throughout the processing of the rendering space (e.g. for a particular frame).

In addition to, or instead of using the per-tile hash values (within the enhanced TCLs) in the scheduling of tiles, the per-tile hash values may be used by the cache controller 127 as part of a cache eviction scheme. As shown in FIG. 2A, the cache controller 127 may select data for eviction from the cache 126 (e.g. to make space to store new data following a cache miss) based on an analysis of per-tile hash values of one or more tiles (block 214), e.g. based on an analysis of the per-tile hash values of the current tile being processed or all the tiles currently being processed.

Figure 2C:
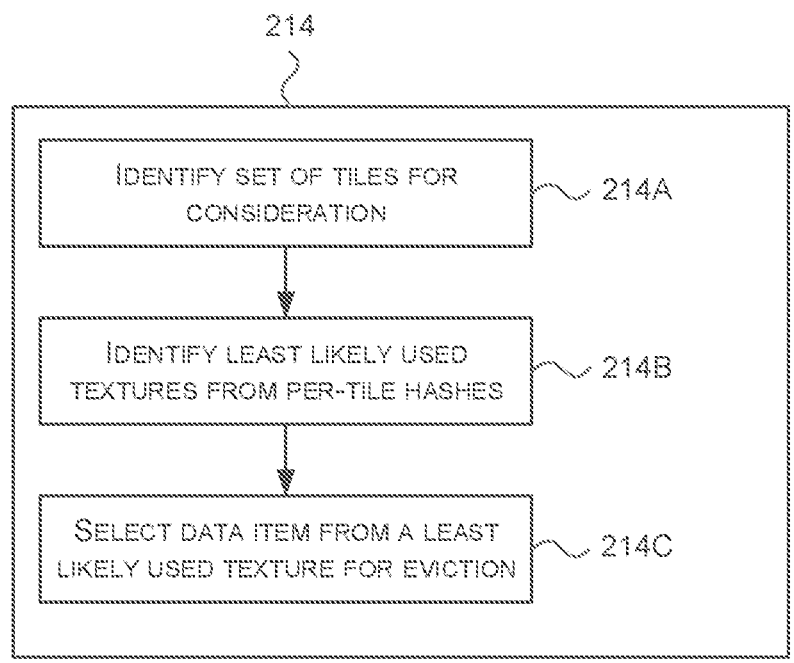

In order to perform the selection (in block 214 as shown in FIG. 2C), the cache controller 127 identifies a set of tiles for consideration (block 214A). As detailed above, this set may comprise a single tile—the current tile being processed. Alternatively, the set may comprise multiple tiles, e.g. all the tiles currently being processed by any of the processing cores 114A-F. In various examples, the set may additionally comprise a group of tiles that are likely to be processed soon (e.g. the next N tiles according to a spatial order scheme). Having identified the set of tiles for consideration (in block 214A), the per-tile hashes for each of these tiles is accessed (e.g. from the TCLs) and analysed to determine one or more textures that are least likely to be used (block 214B). Data items from the one or more least likely to be used textures may then be preferentially selected for eviction (block 214C). In various examples, the least likely to be used textures may be determined by analysing the per-tile hashes for each of the tiles identified for consideration (in block 214A) and increasing the value of a per-texture counter each time the corresponding texture is identified from a per-tile hash. The textures with the lowest per-texture counter values at the end of the analysis of all the per-tile hashes for the tiles identified for consideration, may be identified as the least likely to be used textures.

In a variation of the method of FIG. 2C, each time a tile is scheduled for processing (e.g. in block 208), the values of per-texture counters for each texture that will be accessed by that tile (as determined from the per-tile hash value) may be increased by one and each time that the processing of a tile is completed, the values of per-texture counters for each texture that were accessed by that tile (e.g. as determined from the per-tile hash value) may be decreased by one. In this way, the values of the per-texture counters indicate the number of tiles currently being processed that will access each of the textures. Consequently, it is not necessary to identify a set of tiles for consideration (i.e. block 214A is omitted) and the identification of the least likely to be used textures (in block 214B) involves determining which textures have the lowest of the current values of the per-texture counters. In various examples, the identification (in block 214B) may comprise identifying those per-texture counters having a value of one or less.

In addition to using the per-tile hashes, and in various examples per-texture counters, in a cache eviction scheme (in block 214), the per-tile hashes, and in various examples per-texture counters may be used to determine data to pre-emptively fetch from a lower level cache (e.g. from an L2 cache into an L1 cache). As with the cache eviction policy described above, this increases the probability of cache hits and reduces the likelihood of cache misses and decreases the delays caused when data has to be read from memory. That in turn reduces execution time and bandwidth utilisation and in turn reduces the power consumption of the GPU.

As described above, by generating a per-tile hash value and using this to evict data from the cache 126, there is a lower probability that data that will be required in the short term (i.e. by any other tile currently being processed) will be evicted and hence there is a higher probability that the data required to process the tiles will already be stored in the cache 126. This is likely to increase the number of cache hits and decrease the amount of data that has to be read from memory. That in turn reduces execution time and bandwidth utilisation and in turn reduces the power consumption of the GPU.

Whilst in the examples described herein, the per-tile hash is generated based on the textures accessed when processing a tile in the rendering logic, in a variation on the methods described herein, the per-tile hash may in addition, or instead, be generated based on other resources that are used when processing a tile in the rendering logic, such as based on the shader programs used.

A first further example provides a graphics processing unit configured to process graphics data using a rendering space which is sub-divided into a plurality of tiles, the graphics processing unit comprising: a tiling unit arranged to generate a tile control list for each tile, the tile control list for a tile identifying graphics data items that are present in the tile; a cache for storing texture data for use in rendering tiles; and rendering logic arranged to render the tiles using the tile control lists generated by the tiling unit and texture data stored in the cache; wherein the graphics processing unit comprises per-tile hash generation logic arranged to generate, for each tile, a per-tile hash value based on a set of textures that will be accessed when processing the tile in the rendering logic, and wherein the graphics processing unit is further arranged to store the per-tile hash value for a tile for use by the rendering logic.

The rendering logic may comprise scheduling logic and processing logic and wherein the scheduling logic is arranged to select a next tile to be scheduled for processing by the processing logic based on a comparison of two or more per-tile hash values.

Each per-tile hash value may be a fixed size probabilistic data structure. The fixed size probabilistic data structure may be a Bloom filter.

The per-tile hash generation logic may be arranged to generate, for each tile, a per-tile hash value by: for each texture that will be accessed when processing the tile in the rendering logic, identifying a bit position in the Bloom filter; and setting bits in the Bloom filter at each identified bit position to a default value. The per-tile hash generation logic may be arranged to generate, for each tile, a per-tile hash value by: for each texture that will be accessed when processing the tile in the rendering logic, using each of a plurality of hash functions to identify a bit position in the Bloom filter; and setting bits in the Bloom filter at each identified bit position to a default value.

A second further example provides a method of processing graphics data using a rendering space which is sub-divided into a plurality of tiles, the method comprising: generating, in a graphics processing unit, a tile control list for each tile, the tile control list for a tile identifying graphics data items that are present in the tile; generating, for each tile, a per-tile hash value based on a set of textures that will be accessed when processing the tile in rendering logic in the graphics processing unit; storing the per-tile hash value for a tile for use by the rendering logic; and rendering the tiles, in the rendering logic, using the tile control lists and texture data stored in a cache.

The method may further comprise selecting a next tile to be scheduled for processing, by processing logic in the rendering logic, based on a comparison of two or more per-tile hash values.

A third further example provides a graphics processing system may be configured to perform any of the method described herein.

The graphics processing system may be embodied in hardware on an integrated circuit.

A fourth further example provides computer readable code configured to cause any of the method described herein may be performed when the code is run.

A fifth further example provides an integrated circuit definition dataset that, when processed in an integrated circuit manufacturing system, may configure the integrated circuit manufacturing system to manufacture a graphics processing unit as described herein.

A sixth further example provides an integrated circuit manufacturing system comprising: a non-transitory computer readable storage medium having stored thereon a computer readable description of an integrated circuit that describes a graphics processing unit; a layout processing system configured to process the integrated circuit description so as to generate a circuit layout description of an integrated circuit embodying the graphics processing unit; and an integrated circuit generation system configured to manufacture the graphics processing unit according to the circuit layout description, wherein the graphics processing unit comprises: a tiling unit arranged to generate a tile control list for each tile, the tile control list for a tile identifying graphics data items that are present in the tile; a cache for storing texture data for use in rendering tiles; and rendering logic arranged to render the tiles using the tile control lists generated by the tiling unit and texture data stored in the cache; wherein the graphics processing unit comprises per-tile hash generation logic arranged to generate, for each tile, a per-tile hash value based on a set of textures that will be accessed when processing the tile in the rendering logic, and wherein the graphics processing unit is further arranged to store the per-tile hash value for a tile for use by the rendering logic.

Figure 6:
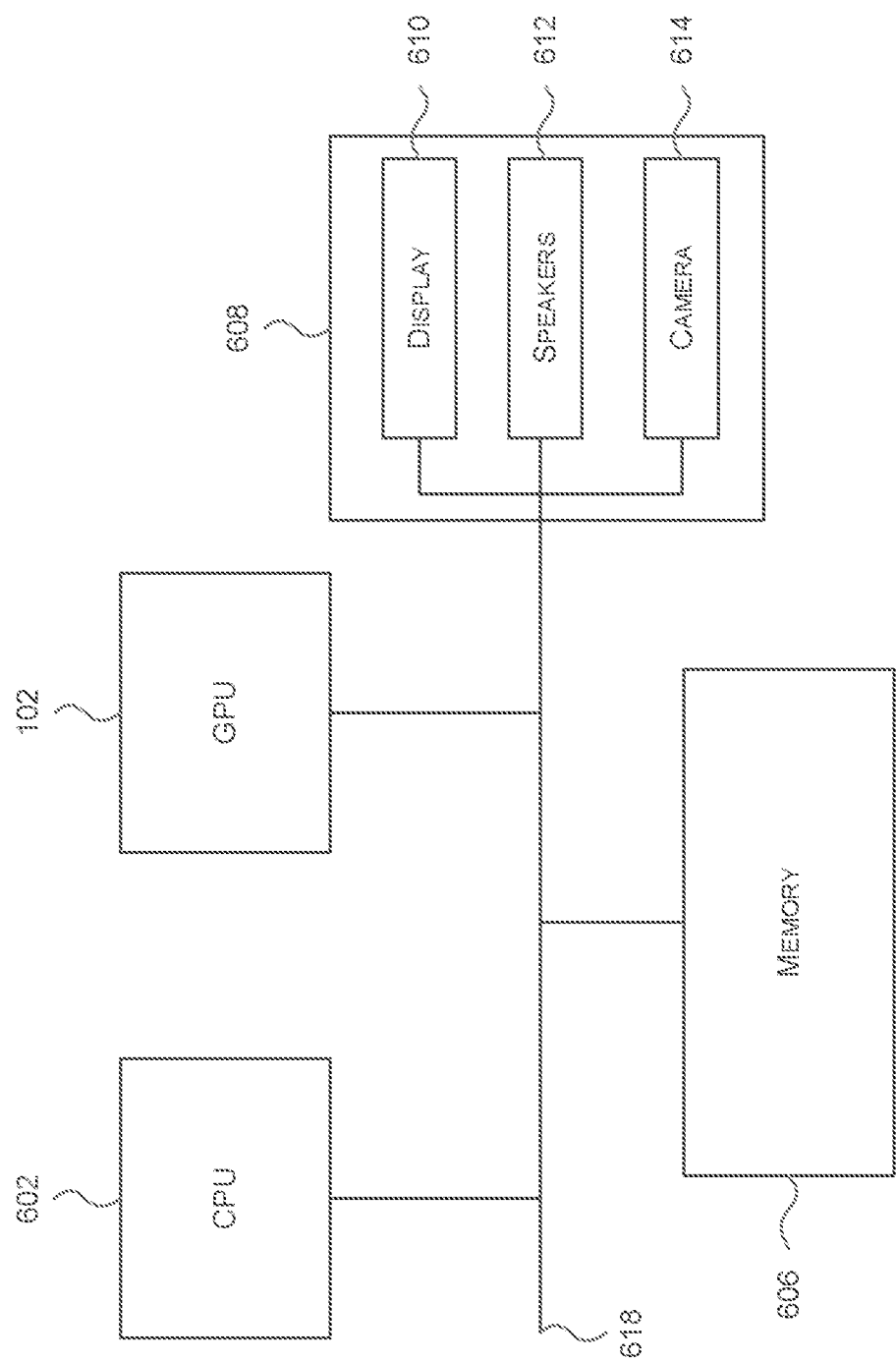
FIG. 6 shows a computer system in which a graphics processing system is implemented.

FIG. 6 shows a computer system in which the graphics processing systems described herein may be implemented. The computer system comprises a CPU 602, a GPU 102 (e.g. as shown in FIG. 1 and described above), a memory 606 and other devices 608, such as a display 610, speakers 612 and a camera 614. The components of the computer system communicate with each other via a communications bus 618.

The GPU 102 in FIG. 1 is shown as comprising a number of functional blocks. This is schematic only and is not intended to define a strict division between different logic elements of such entities. Each functional block may be provided in any suitable manner. It is to be understood that intermediate values described herein as being formed by any of the elements within the GPU need not be physically generated by the particular element at any point and may merely represent logical values which conveniently describe the processing performed by the GPU between its input and output.

The GPUs described herein may be embodied in hardware on an integrated circuit. The GPUs described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a GPU configured to perform any of the methods described herein, or to manufacture a computing device comprising any apparatus described herein. An integrated circuit definition dataset may be, for example, an integrated circuit description.

Therefore, there may be provided a method of manufacturing, at an integrated circuit manufacturing system, a GPU as described herein. Furthermore, there may be provided an integrated circuit definition dataset that, when processed in an integrated circuit manufacturing system, causes the method of manufacturing a GPU to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a GPU will now be described with respect to FIG. 7.

Figure 7:
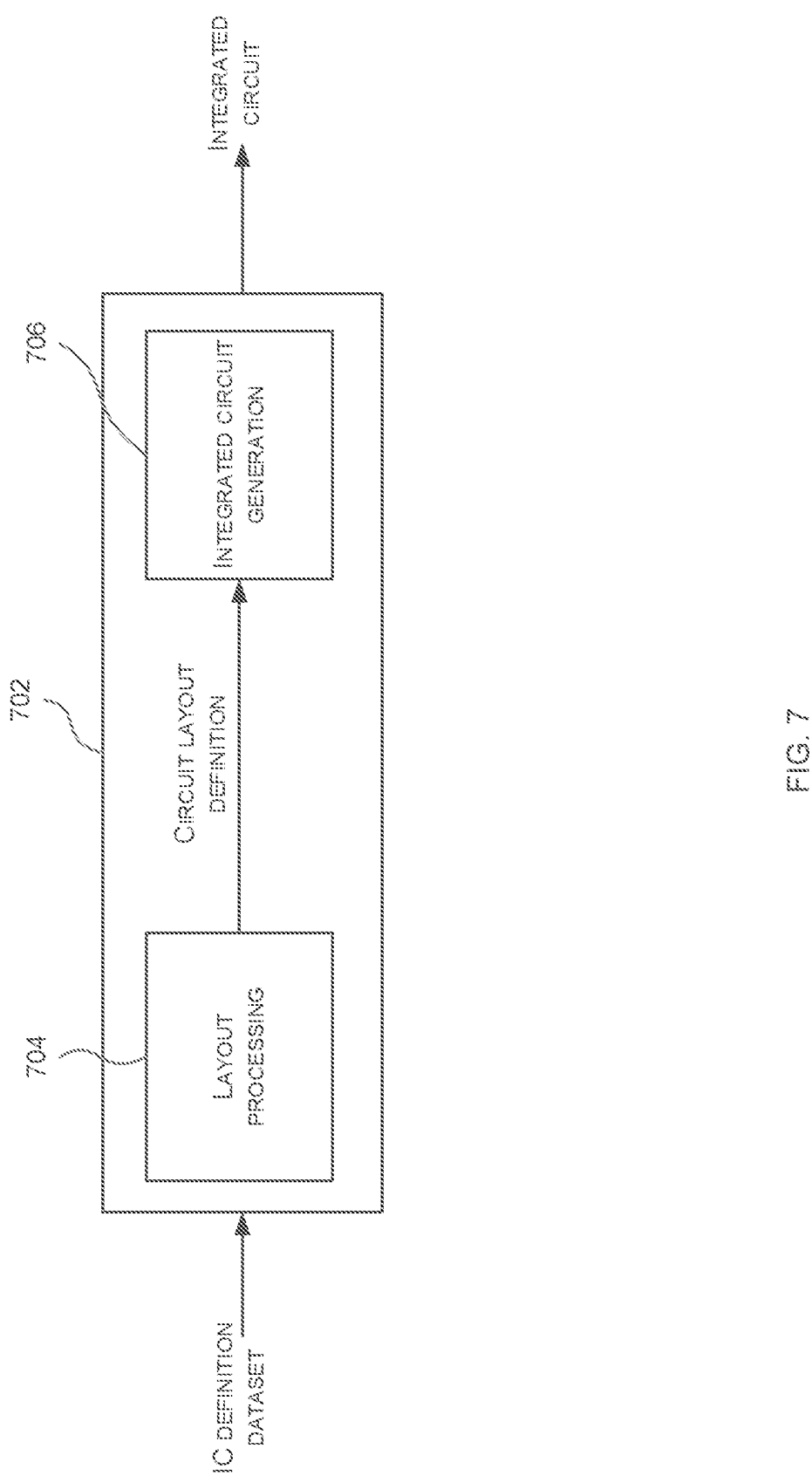
FIG. 7 shows an integrated circuit manufacturing system for generating an integrated circuit embodying a graphics processing system.

FIG. 7 shows an example of an integrated circuit (IC) manufacturing system 702 which is configured to manufacture a GPU as described in any of the examples herein. In particular, the IC manufacturing system 702 comprises a layout processing system 704 and an integrated circuit generation system 706. The IC manufacturing system 702 is configured to receive an IC definition dataset (e.g. defining a GPU as described in any of the examples herein), process the IC definition dataset, and generate an IC according to the IC definition dataset (e.g. which embodies a GPU as described in any of the examples herein). The processing of the IC definition dataset configures the IC manufacturing system 702 to manufacture an integrated circuit embodying a GPU as described in any of the examples herein.

The layout processing system 704 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 704 has determined the circuit layout it may output a circuit layout definition to the IC generation system 706. A circuit layout definition may be, for example, a circuit layout description.

The IC generation system 706 generates an IC according to the circuit layout definition, as is known in the art. For example, the IC generation system 706 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 706 may be in the form of computer-readable code which the IC generation system 706 can use to form a suitable mask for use in generating an IC.

The different processes performed by the IC manufacturing system 702 may be implemented all in one location, e.g. by one party. Alternatively, the IC manufacturing system 702 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a GPU without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 7 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 7, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget."

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described herein to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A graphics processing unit configured to process graphics data using a rendering space which is sub-divided into a plurality of tiles, the graphics processing unit comprising:
    a tiling unit arranged to generate a tile control list for each tile, the tile control list for a tile identifying graphics data items that are present in the tile;
    a cache for storing texture data for use in rendering tiles; and
    rendering logic arranged to render the tiles using the tile control lists generated by the tiling unit and texture data stored in the cache;
    wherein the graphics processing unit comprises per-tile hash generation logic arranged to generate, for each tile, a per-tile hash value based on resources that are used when processing the tile in the rendering logic, wherein each per-tile hash value is a fixed size probabilistic data structure and wherein the graphics processing unit is further arranged to store the per-tile hash value for a tile for use by the rendering logic.

2. The graphics processing unit according to claim 1, wherein the per-tile hash value is generated based on a shader program used when processing the tile in the rendering logic.

3. The graphics processing unit according to claim 1, wherein the rendering logic comprises scheduling logic and processing logic and wherein the scheduling logic is arranged to select a next tile to be scheduled for processing by the processing logic based on a comparison of two or more per-tile hash values.

4. The graphics processing unit according to claim 3, wherein the scheduling logic is arranged to identify a candidate set of tiles and to select a next tile to be scheduled for processing by the processing logic based on a comparison of a per-tile hash value of a currently scheduled tile and the per-tile hash value of at least one of the tiles in the candidate set.

5. The graphics processing unit according to claim 4, wherein the currently scheduled tile is either: (i) a current tile being processed, or (ii) a most recently scheduled tile.

6. The graphics processing unit according to claim 4, wherein the scheduling logic is arranged to identify a candidate set of tiles based, at least in part, on a spatial order scheme.

7. The graphics processing unit according to claim 6, wherein the candidate set comprises a next N tiles according to the spatial order scheme, wherein N is an integer; or
    wherein the candidate set comprises a first tile from each of a next N groups of tiles according to the spatial order scheme, wherein N is an integer.

8. The graphics processing unit according to claim 4, wherein the candidate set comprises one or more tiles adjacent to the current tile being processed.

9. The graphics processing unit according to claim 3, wherein the comparison of two per-tile hash values comprises a bit-wise comparison to identify a number of matching bits in the two per-tile hash values.

10. The graphics processing unit according to claim 1, further comprising a cache controller configured to select an item of texture data to be evicted from the cache based on analysis of two or more per-tile hash values.

11. The graphics processing unit according to claim 10, wherein the cache controller is arranged to identify one or more textures that are least likely to be used based on the analysis of two or more per-tile hash values and to select an item of texture data to be evicted from the cache corresponding to a least likely to be used texture.

12. The graphics processing unit according to claim 10, wherein the cache controller is arranged to identify the one or more least likely to be used textures based on the analysis of per-tile hash values for at least one tile being processed by the rendering logic.

13. The graphics processing unit according to claim 1, wherein the rendering logic comprises a plurality of processing cores, wherein the cache is accessible to each of the plurality of processing cores.

14. The graphics processing unit according to claim 1, wherein the fixed size probabilistic data structure is a Bloom filter.

15. The graphics processing unit according to claim 14, wherein the per-tile hash generation logic is arranged to generate, for each tile, a per-tile hash value by:
    for each texture that will be accessed when processing the tile in the rendering logic, identifying a bit position in the Bloom filter; and
    setting bits in the Bloom filter at each identified bit position to a default value.

16. The graphics processing unit according to claim 14, wherein the per-tile hash generation logic is arranged to generate, for each tile, a per-tile hash value by:
    for each texture that will be accessed when processing the tile in the rendering logic, using each of a plurality of hash functions to identify a bit position in the Bloom filter; and setting bits in the Bloom filter at each identified bit position to a default value.

17. The graphics processing unit according to claim 1 wherein the per-tile hash generation logic is included in the tiling unit.

18. The graphics processing unit according to claim 1 wherein the graphics processing unit is arranged to store the per-tile hash value for a tile within the tile control list for the tile.

19. A method of processing graphics data using a rendering space which is sub-divided into a plurality of tiles, the method comprising:
- generating, in a graphics processing unit, a tile control list for each tile, the tile control list for a tile identifying graphics data items that are present in the tile;
- generating, for each tile, a per-tile hash value based on resources that are used when processing the tile in rendering logic in the graphics processing unit, wherein each per-tile hash value is a fixed size probabilistic data structure;
- storing the per-tile hash value for a tile for use by the rendering logic; and
- rendering the tiles, in the rendering logic, using the tile control lists and texture data stored in a cache.

20. An integrated circuit manufacturing system comprising:
- a non-transitory computer readable storage medium having stored thereon a computer readable dataset description of an integrated circuit that describes a graphics processing unit which comprises:
  - a tiling unit arranged to generate a tile control list for each tile, the tile control list for a tile identifying graphics data items that are present in the tile,
  - a cache for storing texture data for use in rendering tiles, and
  - rendering logic arranged to render the tiles using the tile control lists generated by the tiling unit and texture data stored in the cache,
  - wherein the graphics processing unit comprises per-tile hash generation logic arranged to generate, for each tile, a per-tile hash value based on resources that are used when processing the tile in the rendering logic, wherein each per-tile hash value is a fixed size probabilistic data structure and wherein the graphics processing unit is further arranged to store the per-tile hash value for a tile for use by the rendering logic;
- a layout processing system configured to process the integrated circuit description so as to generate a circuit layout description of an integrated circuit embodying the graphics processing unit; and
- an integrated circuit generation system configured to manufacture the graphics processing unit according to the circuit layout description.

* * * * *